(12) United States Patent
Aiso et al.

(10) Patent No.: US 7,864,355 B2
(45) Date of Patent: Jan. 4, 2011

(54) APPARATUS AND METHOD FOR TRANSMITTING IMAGE

(75) Inventors: Seiji Aiso, Shiojiri (JP); Takao Ozawa, Shiojiri (JP); Kosuke Matsunaga, Oita (JP); Toshifumi Sakai, Shioziri (JP)

(73) Assignee: Seiko Epson Corporation, Tokyo (JP)

( * ) Notice: Subject to any disclaimer, the term of this patent is extended or adjusted under 35 U.S.C. 154(b) by 993 days.

(21) Appl. No.: 11/704,711

(22) Filed: Feb. 9, 2007

(65) Prior Publication Data

US 2007/0229913 A1 Oct. 4, 2007

(30) Foreign Application Priority Data

Feb. 10, 2006 (JP) .............................. 2006-033604
Apr. 3, 2006 (JP) .............................. 2006-101675

(51) Int. Cl.
*G06F 3/12* (2006.01)

(52) U.S. Cl. ....................................... 358/1.15; 358/474

(58) Field of Classification Search ....................... None
See application file for complete search history.

(56) References Cited

U.S. PATENT DOCUMENTS

| | | | | |
|---|---|---|---|---|
| 6,141,111 A * | 10/2000 | Kato | ......................... | 358/1.15 |
| 6,675,197 B1 * | 1/2004 | Satoh et al. | .................. | 709/204 |
| 6,867,875 B1 * | 3/2005 | Kanai et al. | ................. | 358/1.15 |
| 7,027,172 B1 * | 4/2006 | Parulski et al. | ............. | 358/1.15 |
| 7,131,067 B1 * | 10/2006 | Ikeda | ......................... | 715/209 |
| 7,664,296 B2 * | 2/2010 | Tsubaki et al. | .............. | 382/118 |
| 7,697,152 B2 * | 4/2010 | Hisatomi et al. | ............ | 358/1.15 |
| 7,760,377 B2 * | 7/2010 | Hirabayashi | ................ | 358/1.15 |
| 2001/0019416 A1 * | 9/2001 | Monty et al. | .................. | 358/1.9 |
| 2002/0054373 A1 * | 5/2002 | Nishiyama | ................... | 358/452 |
| 2004/0047001 A1 * | 3/2004 | Gehring et al. | ............. | 358/1.18 |
| 2004/0134978 A1 | 7/2004 | Hara et al. | | |
| 2005/0031190 A1 * | 2/2005 | Gann | ......................... | 382/151 |
| 2005/0213174 A1 | 9/2005 | Maki et al. | | |
| 2006/0170968 A1 | 8/2006 | Maki et al. | | |

(Continued)

FOREIGN PATENT DOCUMENTS

JP 09-036991 2/1997

(Continued)

OTHER PUBLICATIONS

Abstract of Japanese Patent Publication No. 10-322540, Publication Date: Dec. 4, 1998, Patent Abstracts of Japan.

(Continued)

*Primary Examiner*—King Y Poon
*Assistant Examiner*—Dung D Tran
(74) *Attorney, Agent, or Firm*—Martine Penilla & Gencarella, LLP

(57) ABSTRACT

A printing apparatus creates and prints an order sheet on which a list of image data is placed. By filling in marking fields on the order sheet a user can select image data for transmission. Once the order sheet has been scanned by the scanner, the printing apparatus creates an e-mail having attached to it the image data selected by the user, and sends this to a computer or the like via a mail server. It is possible in this way to easily select image data for transmission through a prescribed communications network.

12 Claims, 17 Drawing Sheets

U.S. PATENT DOCUMENTS

2006/0187477 A1    8/2006    Maki et al.

FOREIGN PATENT DOCUMENTS

| | | |
|---|---|---|
| JP | 10-322540 | 12/1998 |
| JP | 11-020275 | 1/1999 |
| JP | 2000-253228 | 9/2000 |
| JP | 2001-134502 | 5/2001 |
| JP | 2003-051850 | 2/2003 |
| JP | 2003-114855 | 4/2003 |
| JP | 2003-309701 | 10/2003 |
| JP | 2004-112265 | 4/2004 |
| JP | 2004-135122 | 4/2004 |
| JP | 2005-038308 | 2/2005 |
| JP | 2005-136702 | 5/2005 |
| JP | 2006-054690 | 2/2006 |

OTHER PUBLICATIONS

Abstract of Japanese Patent Publication No. 2003-051850, Publication Date: Feb. 21, 2003, Patent Abstracts of Japan.

Abstract of Japanese Patent Publication No. 2003-114855, Publication Date: Apr. 18, 2003, Patent Abstracts of Japan.

Abstract of Japanese Patent Publication No. 2004-112265, Publication Date: Apr. 8, 2004, Patent Abstracts of Japan.

Abstract of Japanese Patent Publication No. 09-036991, Pub. Date: Feb. 7, 1997, Patent Abstracts of Japan.

Abstract of Japanese Patent Publication No. 11-020275, Pub. Date: Jan. 26, 1999, Patent Abstracts of Japan.

Abstract of Japanese Patent Publication No. 2001-134502, Pub. Date: May 18, 2001, Patent Abstracts of Japan.

Abstract of Japanese Patent Publication No. 2004-135122, Pub. Date: Apr. 30, 2004, Patent Abstracts of Japan.

Abstract of Japanese Patent Publication No. 2003-309701, Pub. Date: Oct. 31, 2003, Patent Abstracts of Japan.

Abstract of Japanese Patent Publication No. 2005-136702, Pub. Date: May 26, 2005, Patent Abstracts of Japan.

Abstract of Japanese Patent Publication No. 2000-253228, Pub. Date: Sep. 14, 2000, Patent Abstracts of Japan.

Abstract of Japanese Patent Publication No. 2005-038308, Pub. Date: Feb. 10, 2005, Patent Abstracts of Japan.

Abstract of Japanese Patent Publication No. 2006-054690, Pub. Date: Feb. 23, 2006, Patent Abstracts of Japan.

* cited by examiner

Fig.5

E-MAIL TRANSMISSION ORDER SHEET

Fig.6

E-MAIL TRANSMISSION ORDER SHEET

ADDRESSEE
a: RECIPIENT A <a@aaa.bbb.ccc>
b: RECIPIENT B <b@ddd.eee.fff>
c: |c|@|z|z|z|.|z|z|z|.|j|p| | | | |

RESIZE:
- ● 320 SIZE
- ○ 640 SIZE
- ○ 960 SIZE
- ○ 1280 SIZE

| No.1 | No.2 | No.3 | No.4 | No.5 |
|------|------|------|------|------|
| ● ⓑ ⓒ | ⓐ ⓑ ⓒ | ⓐ ⓑ ⓒ | ⓐ ⓑ ⓒ | ⓐ ⓑ ⓒ |

| No.6 | No.7 | No.8 | No.9 | No.10 |
|------|------|------|------|-------|
| ⓐ ⓑ ⓒ | ⓐ ● ⓒ | ● ⓑ ● | ⓐ ⓑ ⓒ | ⓐ ⓑ ⓒ |

SUBJECT: |P|i|c|t|u|r|e|s| |f|r|o|m| |*|*| | | |

MESSAGE:
PICTURES FROM THE OTHER DAY!

MAIL SERVER ADDRESS: |2|0|2|.| |1|1|.|x|x|x|.|x|x|x|

SENDER'S E-MAIL ADDRESS: |z|z|z|@|x|x|x|.|x|x|.|j|p| | |

Fig.7

SENDER: ○○ <zzz@xxx.xx.jp>

ADDRESSEE: RECIPIENT A <a@aaa.bbb.ccc>

SUBJECT: Pictures from **

** HAS SENT YOU A MESSAGE AND PICTURES.

PICTURES FROM THE OTHER DAY!

405 — ORDER SHEET

410

ADDRESSEE

| | GROUP 1 | GROUP 2 | GROUP 1 |
|---|---|---|---|
| RECIPIENT A (PREVIOUSLY REGISTERED) | ○ | ○ | ○ |
| RECIPIENT B (PREVIOUSLY REGISTERED) | ○ | ○ | ○ |
| RECIPIENT C (PREVIOUSLY REGISTERED) | ○ | ○ | ○ |
| OTHER | ○ | ○ | ○ |

FIRST DIGIT  1○ 2○ 3○ 4○ 5○ 6○ 7○ 8○ 9○ 0○
SECOND DIGIT 1○ 2○ 3○ 4○ 5○ 6○ 7○ 8○ 9○ 0○
⋮
Nth DIGIT    1○ 2○ 3○ 4○ 5○ 6○ 7○ 8○ 9○ 0○

420

IMAGE SELECTION

| | IMAGE A | IMAGE B | IMAGE C |
|---|---|---|---|
| TO GROUP 1 | ○ | ○ | ○ |
| TO GROUP 2 | ○ | ○ | ○ |
| TO GROUP 3 | ○ | ○ | ○ |

430

DELIVERY COMMENT

| | | | |
|---|---|---|---|
| "PRINT AT L SIZE" | ○ | "PLEASE PRINT NEATLY" | ○ |
| "PRINT AT A4 SIZE" | ○ | "HERE IS THE PHOTO I PROMISED," | ○ |
| "PRINT ON PHOTO PAPER" | ○ | "HI, IT'S (MY NAME)" | ○ |
| "PRINT ON PLAIN PAPER" | ○ | | |

FREE COMMENT ○

HANDWRITTEN INPUT AREA

APPARATUS AND METHOD FOR TRANSMITTING IMAGE

CROSS-REFERENCE TO RELATED APPLICATIONS

The present application claims the priority based on Japanese Patent Applications No. 2006-33604 filed on Feb. 10, 2006 and No. 2006-101675 filed on Apr. 3, 2006, the disclosures of which are hereby incorporated by reference in their entirety.

BACKGROUND

1. Technical Field

The present invention relates to a technology for transmitting image data through a prescribed communications network.

2. Related Art

With the spread of the Internet seen in recent years, it has become quite common for image data shot with a digital camera or the like to be sent in the form of an e-mail attachment.

However, sending image data in the form of an e-mail attachment typically requires proficiency in computer operation. Thus, for a user not experienced with operating a computer, the task of attaching image data to an e-mail represents a very advanced task.

With regard to this issue, JP-A-2005-136072 discloses a technology for transmitting image data using a facsimile apparatus. The facsimile apparatus displays a list of image data and e-mail addresses on the display unit, and enables the user to select from the list a recipient and image data for transmission.

However, in some instances, it is difficult to specify image data for transmission from among that listed on the display unit. Because the display unit of a facsimile or similar apparatus is quite small in most cases.

In conventional facsimile transmission, the image acquired by the sending terminal is converted to an audio signal, which is sent to the receiving terminal over a voice communications network. As this voice communications network, it is possible to employ the ordinary phone system used in the past, or more recently, to employ a phone system that utilizes the Internet (an IP phone system). For example, JP-A-2003-309701 proposes a facsimile apparatus that utilizes transmission of audio signals over an IP phone system, for facsimile transmission via a network.

Some facsimile apparatus of this kind have a communications control apparatus installed, with communications being controlled by the communications control apparatus. Some of these installed communications control apparatus are used as hardware keys. However, where an image is sent by the communications control apparatus on the transmitting end, and the image by itself is then received as-is and printed out by the communications control apparatus on the receiving end, there are instances in which printing takes place with the wrong paper size, resulting in waste of ink and paper. There are also instances where, when the communications control apparatus on the transmitting end has transmitted an image, the image is received by the communications control apparatus on the receiving end with no indication as to the sender's intent besides paper size mentioned previously, and while a message could be sent on an additional sheet, this will not be sufficient in some instances.

For example, even where a message representing the sender's intent has been written on an initial cover page, the communications control apparatus on the receiving end will simply continue to receive the data of the second and subsequent pages as-is, and in some instances it will not be possible to receive and print the data in the form that reflects the sender's intent. An additional problem is that in some instances the transmitted message is a simple one that, if the communications control apparatus on the receiving end has an LCD screen, could be viewed on the screen without having to print out the message entered on the cover sheet on one extra page, and in such instances printing out the message would be a waste.

SUMMARY

In consideration of the several issues discussed above, it is an object of the present invention to facilitate selection of image data for transmission through a prescribed communications network. And it is another object of the present invention to transmit a simple message to a receiver without an additional sheet, when transmitting image data.

With the foregoing in view, the image transmission apparatus according to an aspect of the present invention is constituted as follows. The aspect of the invention is an image transmission apparatus for transmitting image data through a prescribed communications network, comprising an input unit that inputs image data; a printing unit that prints an order sheet that has an image designation field for designation of image data for the transmission, from among the input image data; a scanning unit that scans the order sheet that has been filled in by the user; an analyzing unit that analyzes the scanned order sheet and identifies the image data designated by the image designation field on the order sheet; and a transmitting unit that transmits the identified image data to a prescribed recipient.

The image transmission apparatus prints out an order sheet having an image designation field that permits designation of image data intended for transmission. Using this order sheet, the user designates certain image data. Once the image transmission apparatus has scanned this order sheet, the image data designated by the order sheet will be transmitted to the prescribed recipient. With the image transmission apparatus configured in this way, it is possible for the user to easily designate image data for transmission, by using the order sheet.

In the image transmission apparatus configured in the above manner, the printing unit may be constituted to additionally print on the order sheet a comment input field for input of a comment; and the analyzing unit may be constituted to analyze the scanned order sheet and acquire the comment; the apparatus further comprising a thumbnail image creating unit for creating a thumbnail image of the acquired comment superimposed on a reduced image of prescribed image data; and a writing unit for writing the created thumbnail image to a unit of the image data for transmission.

According to this configuration, a thumbnail image having a superimposed comment is written to a portion of the image data, whereby it is possible for the recipient of the image data to transmit a simple message, without the need for extra paper.

In addition to being embodied as the image transmission apparatus described above, the present invention can also be embodied as an image transmission method for transmission of images by an image transmission apparatus equipped with a printing unit and a scanner; or as a computer program. The computer program could be recorded on a computer-recordable medium. Examples of computer-recordable media that can be used for this purpose are flexible disks, CD-ROM, DVD-ROM, magnetooptical disks, memory cards, hard disks, and various other media. It is also possible for the invention to be reduced to practice in various other forms such as a data signal containing a computer program and carried on a carrier wave, a computer program product, or the like.

These and other objects, features, aspects, and advantages of the present invention will become more apparent from the following detailed description of the preferred embodiments with the accompanying drawings.

BRIEF DESCRIPTION OF THE DRAWINGS

FIG. 5 is an illustration depicting an example of an order sheet.

FIG. 6 is an illustration depicting an example of filling out the order sheet.

FIG. 7 is an illustration depicting an example of a transmitted e-mail.

FIG. 11 is an illustration illustrating the general design of an order sheet.

DESCRIPTION OF THE PREFERRED EMBODIMENT

An understanding of the operation and effects of the present invention hereinabove will be provided based on the following description of certain preferred embodiments of the invention, made in the order indicated below:
A. 1st Embodiment:
  A1. Configuration of Printing Apparatus:
  A2. Image Data Transmission Process:
  A3. Modifications of Embodiment 1:
B. 2nd Embodiment:
  B1. Configuration of Information Processing System:
  B2. Order Sheet Printing Process:
  B3. Order Sheet Transmission Process:
C. Other Aspects:

A. 1st Embodiment

Figure 1:
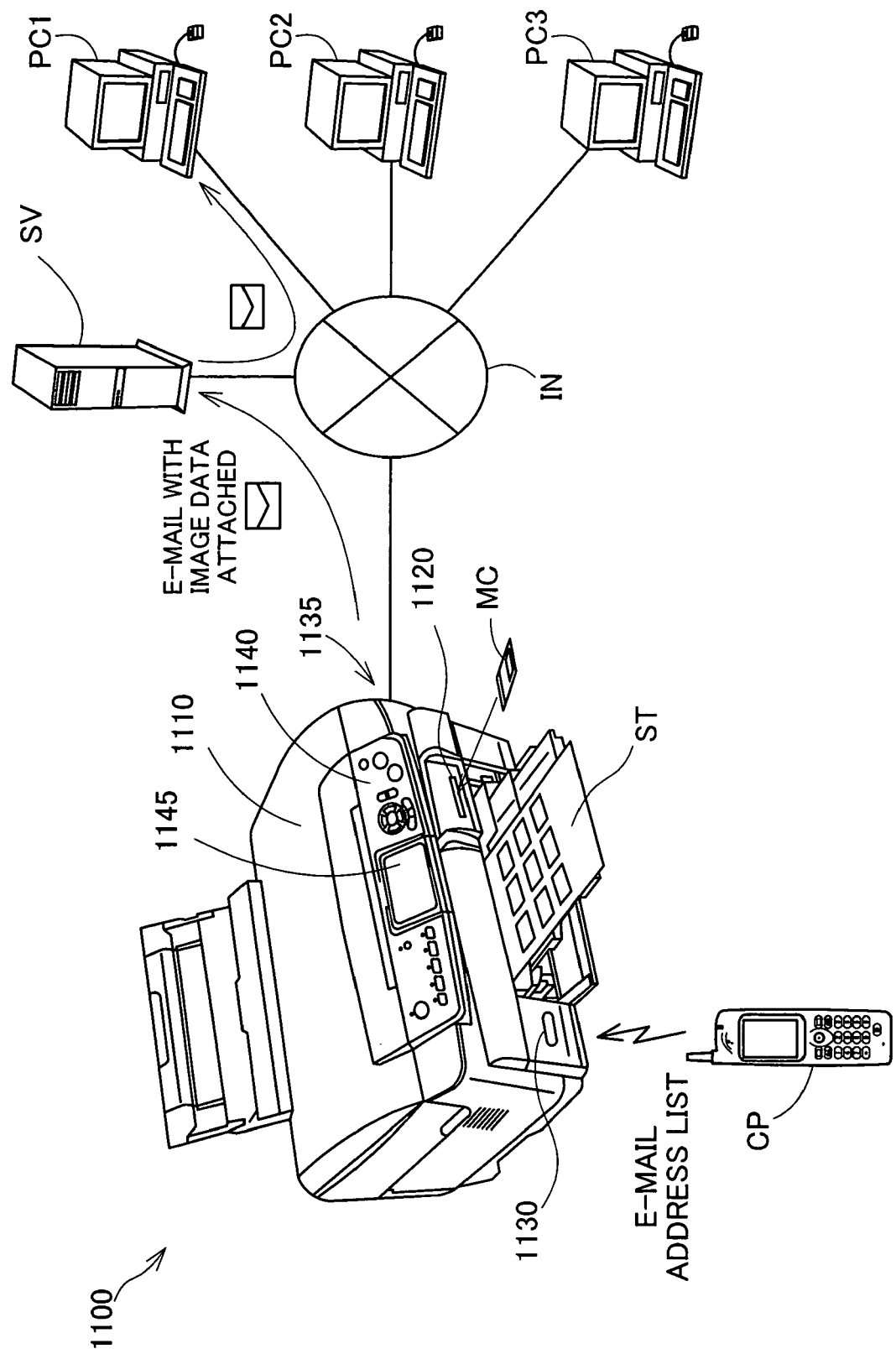
FIG. 1 is an illustration of the configuration of a printing apparatus.

A1. Configuration of Printing Apparatus:

FIG. 1 is an illustration of the configuration of a printing apparatus 1100 as an image transmission apparatus of an aspect of the present invention. The printing apparatus 1100 is a printing apparatus of so-called multifunction type equipped with a scanner 1110 for optical scanning of images; a memory card slot 1120 for insertion of a memory card MC having image data recorded thereon; an infrared interface 1130 for carrying out infrared communication with a cell phone CP in accordance with IrDA (Infrared Data Association) standards; and a network interface 135 for connection to an Internet IN. The printing apparatus 1100 is capable of printing images scanned by the scanner 1110, or images read from the memory card MC.

The printing apparatus 1100 is also furnished with a control panel 1140 for performing various operations relating to printing. A liquid crystal monitor 1145 is located in the center of the control panel 1140. This liquid crystal monitor 1145 displays image data read from the memory card MC etc., and a GUI (Graphical User Interface) during utilization of various functions of the printing apparatus 1100.

The printing apparatus 1100 is connected to the Internet IN via a network interface 1135. Also connected to the Internet IN are a mail server SV and several computers PC1-PC3. The mail server SV is a so-called SMTP (Simple Mail Transfer Protocol) server, and is used for sending e-mail. The printing apparatus 1100 has a function for attaching image data input from the memory card MC etc. to e-mail, and sending it to the computers PC1-PC3 through the mail server SV. A user can designate image data for transmission, using an order sheet ST which is output by the printing apparatus 1100.

Via the infrared interface 1130, the printing apparatus 1100 can acquire a list of e-mail addresses from a portable information terminal such as a cell phone CP or PDA (Personal Digital Assistance). The printing apparatus 1100 can then send e-mails with image data attached, to e-mail addresses selected from this list.

Figure 2:
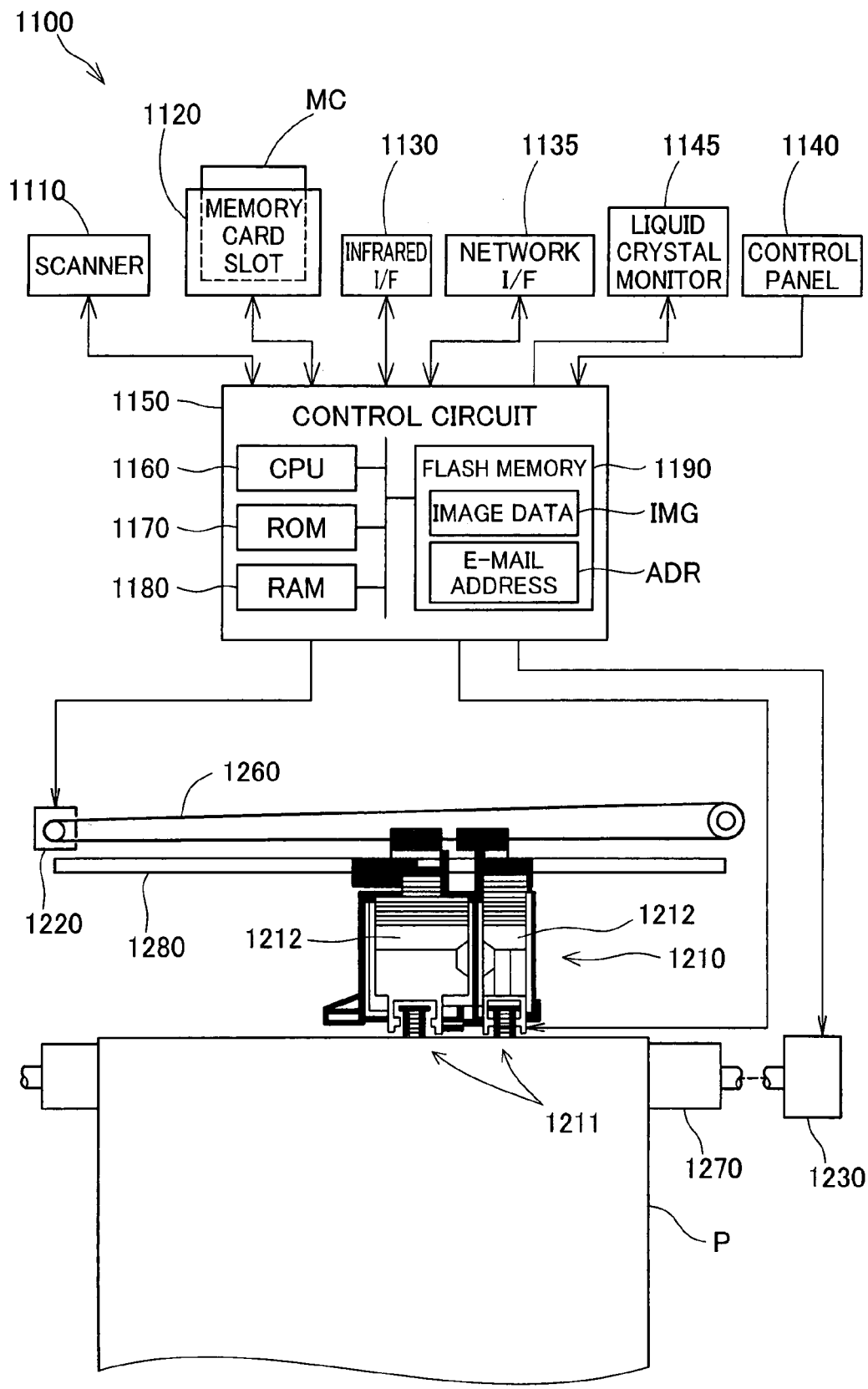
FIG. 2 is an illustration of the internal configuration of the printing apparatus.

FIG. 2 is an illustration of the internal configuration of the printing apparatus 1100. As illustrated, the printing apparatus 1100 is provided, by way of a mechanism for carrying out printing, with a carriage 1210 having on-board ink cartridges 1212; a carriage motor 1220 for driving the carriage 1210 in the main scanning direction; and a paper feed motor 1230 for transporting printing paper P in the sub-scanning direction.

The carriage 1210 is provided with a total of six ink heads 1211 containing inks for representing the colors cyan, magenta, yellow, black, light cyan, and light magenta. The ink cartridges 1212 containing these inks are attached on the carriage 1210, and the ink delivered from the ink cartridges 1212 to the ink heads 1211 is ejected onto the printing paper P by means of actuating piezo elements, not shown.

The carriage 1210 is slidably held on a slide rail 1280 positioned parallel to the axial direction of a platen 1270. The carriage motor 1220 turns a drive belt 1260 in response to an instruction from a control circuit 1150, thereby reciprocating the carriage 1210 parallel to the axial direction of the platen 1270, i.e. in the main scanning direction.

By rotating the platen 1270, the paper feed motor 1230 transports the printing paper P perpendicular to the axial direction of the platen 1270. That is, the paper feed motor 1230 can move the carriage 1210 relatively in the sub-scanning direction.

The printing apparatus 1100 is furnished with the control circuit 1150, which controls the operations of the ink heads 1211, the carriage motor 1220, and the paper feed motor 1230 mentioned above. The control circuit 1150 is connected to the scanner 1110, the memory card slot 1120, the infrared interface 1130, the network interface 1135, the control panel 1140, and the liquid crystal monitor 1145 shown in FIG. 1.

The control circuit 1150 is composed of a CPU 1160, a ROM 1170, a RAM 1180, and a flash memory 1190. A control program for controlling the operations of the printing apparatus 1100 is stored in the ROM 1170. The CPU 1160 loads the control program into the RAM 1180, and executes it in order to carry out various processes that will be discussed later. The CPU 1160 corresponds to the "input unit," "printing unit," "scanning unit," and "analyzing unit," and "transmitting unit" herein.

The flash memory 1190 is a storage device for storing image data IMG acquired from the memory card MC etc., as well as a list of e-mail addresses ADR acquired from the cell phone CP via the infrared interface 1230. While flash memory is provided as the storage device in the present embodiment, a hard disk drive or other storage device could be provided instead. The e-mail addresses ADR may be acquired not only from the cell phone CP, but also from a computer connected to the printing apparatus 1100; or input by the user from the control panel 1140.

A2. Image Data Transmission Process

Figure 3:
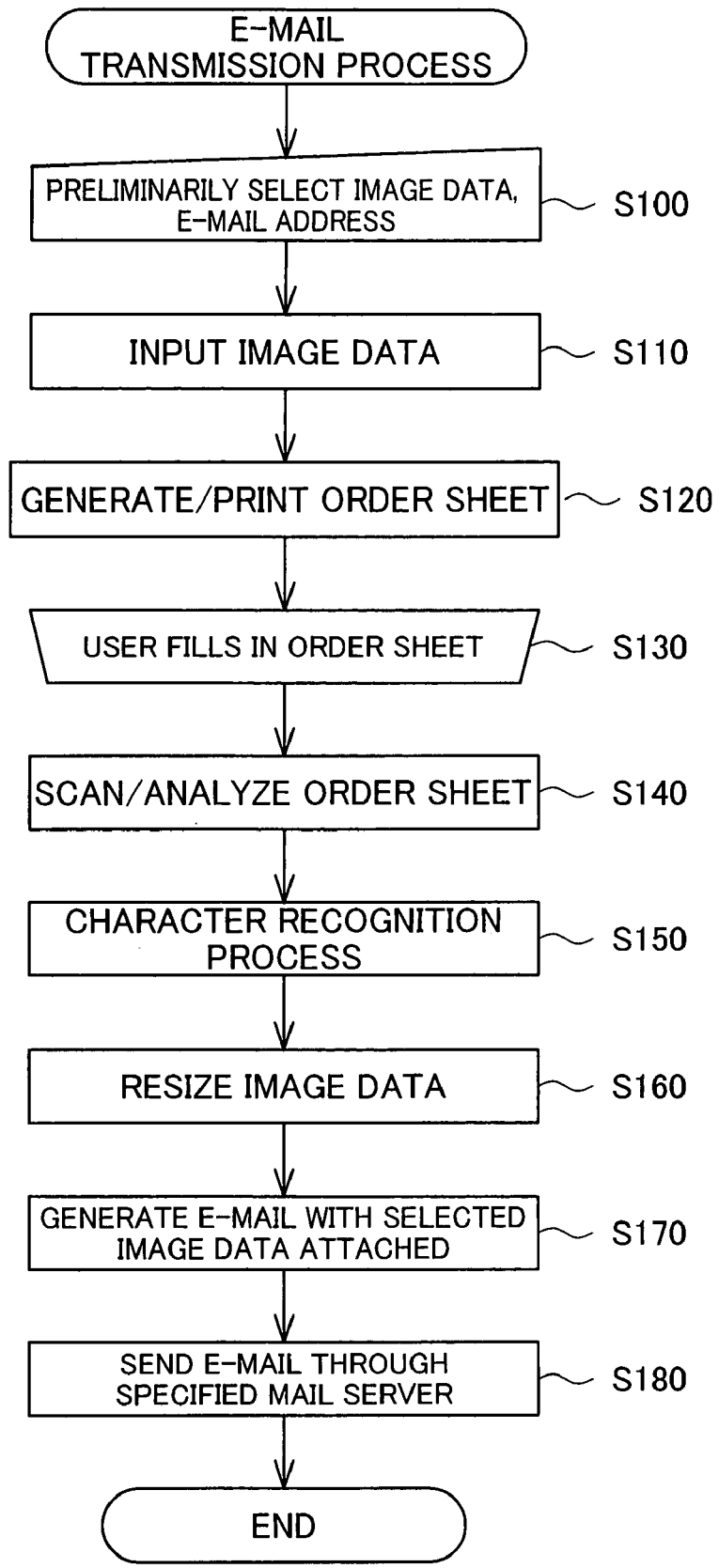
FIG. 3 is a flowchart of an e-mail transmission process.

FIG. 3 is a flowchart of an e-mail transmission process executed by the CPU 1160 on the basis of the control program stored in the ROM 1170. This process is executed when the function of sending an e-mail has been selected from the GUI displayed on the liquid crystal monitor 1145.

When this process is executed, first, the CPU 1160 performs a process of displaying a prescribed GUI on the liquid crystal monitor 1145 in order to prompt the user to preliminarily select image data for attachment to an e-mail, and a recipient e-mail address (Step S100). Preliminary selection refers to selection of general ranges of image data and e-mail address, prior to selection of these by the order sheet ST to be discussed later.

Figure 4:
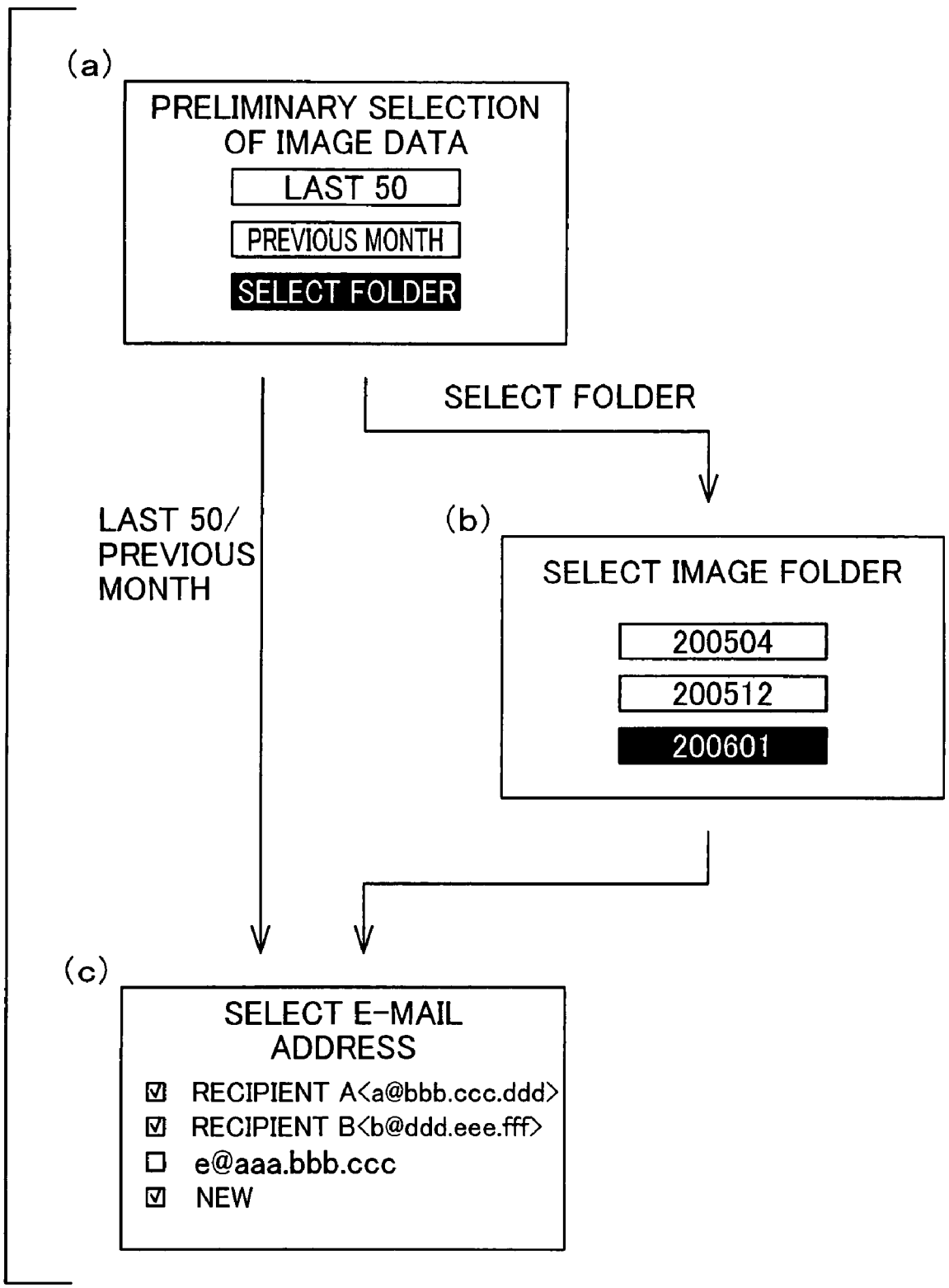
FIG. 4 is an illustration depicting example GUI displayed on a liquid crystal monitor.

FIG. 4 is an illustration depicting example GUI displayed on a liquid crystal monitor 1145 by the CPU 1160 in the above Step S100. The portion indicated by (a) in FIG. 4 shows a GUI for making preliminary selection of image data. This GUI displays the menu options "Last 50," "Previous month," and "Select folder." The "Last 50" option represents selection of image data for the last 50 images based on the shooting date of the image data; and the "Previous month" option represents selection of image data shot within the previous one month period, based on the shooting date of the image data. The "Select folder" option represents specifying a folder storing image data, on the memory card MC or in the flash memory 1190.

In the event that the user has selected "Select folder" from the menu described above, the GUI on the liquid crystal monitor 1145 now switches to a GUI for folder selection. The GUI after the switch is shown in (b) in FIG. 4. In the example depicted here, three folders, i.e. folders named "200504," "200512," and "200601" are displayed. From the displayed folders, the user selects the folder containing the desired image.

Once preliminary selection of image data through the GUI described above has been completed, next a GUI for preliminary selection of e-mail address is displayed. An example of the GUI for preliminary selection of e-mail address is depicted in the portion indicated by (c) in FIG. 4. The CPU 1160 displays on this GUI the list of e-mail addresses which is stored in the flash memory 1190. In the example shown here, the GUI displays the e-mail addresses of three individuals, and the item "New." The "New" option is provided for the purpose of sending an e-mail to a recipient who is not included in the aforementioned list. Using the checkboxes, the user selects the e-mail address of the intended recipient(s) from the list of e-mail addresses displayed in this way. (c) in FIG. 4 depicts the case where e-mail is to be sent to three individuals, namely, "a@aaa.bbb.ccc," "b@ddd.eee.fff," and "New." The e-mail addresses are shown with the most recently selected address displayed preferentially at the top of the list. The affords quick selection of recipients to whom one frequently transmits image data.

The discussion now refers back to FIG. 3. When preliminary selection of image data and e-mail addresses is completed, the CPU 1160 inputs from the memory card MC or flash memory 1190 the image data from the range selected in the preliminary selection process (Step S110). Next, an order sheet ST having arranged thereon the input image data and the e-mail addresses selected in the above Step S110 is generated and printed out (Step S120).

Figure 5:
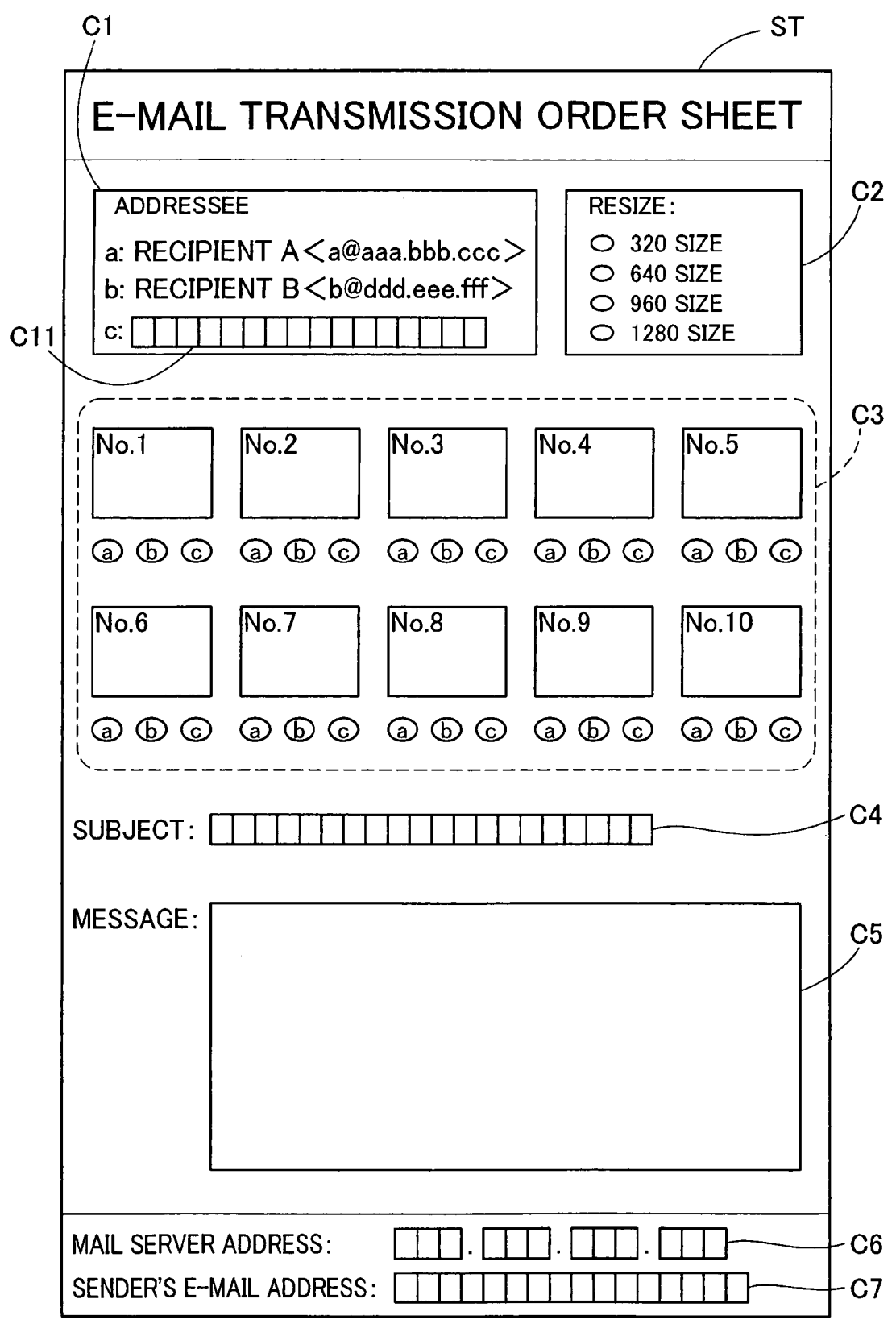

FIG. 5 is an illustration depicting an example of the order sheet ST generated and printed out in Step S120. As illustrated, this order sheet ST has a recipient address field C1, a resizing field C2, an image designation field C3, a subject field C4, a message field C5, a server address field C6, and a sender's address field C7.

The e-mail addresses specified in the above Step S100 are placed in the recipient address field C1. In the example depicted in FIG. 5, the two e-mail addresses ("a@aaa.bbb.ccc" and "b@ddd.eee.fff") that were selected from the GUI shown in (c) in FIG. 4 are shown, together with a field C11 for entering a new address. Using a writing implement, the user enters in the new address field C11 the new e-mail address to which the image data is to be sent.

The resizing field C2 is a field for adjusting the size of the image data for transmission. In this resizing field C2 it is possible to select any of four sizes, namely 320 size, 640 size, 960 size, and 1280 size. The numerical value of each size represents the number of pixels of the long side of the image data subsequent to resizing. The user can adjust the size of the image data by filling in the marking field located to the right side of each size, using a writing implement. However, in the event that none of the marking fields have been filled in, the image data will not be resized. It would also be possible to resize the image data to the default size (e.g. 1024 size) in the event that none of the marking fields have been filled in.

The image designation field C3 contains reduced images of the image data input in the preceding Step S110. FIG. 5 depicts a case where 10 images have been arranged. Marking fields marked as "a," "b," and "c" are provided below each image. These marking fields correspond respectively to the e-mail addresses denoted as "a," "b," and "c" in the recipient address field C1. Specifically, if the marking field marked as "a" is filled in with a writing implement, the corresponding image data will be sent to the e-mail address "a@aaa.bbb.ccc," and if the marking field marked as "b" is filled in with a writing implement, the corresponding image data will be sent to the e-mail address "b@ddd.eee.fff." If the marking field marked as "c" is filled in with a writing implement, the corresponding image data will be sent to the new e-mail address. That is, by specifying recipient e-mail addresses from the image designation field C3, image data for transmission can be classified and transmitted accordingly to each individual recipient. In FIG. 5, the marking fields ("a," "b," and "c") are provided in equal number to the recipients indicated in the recipient address field C1; however, it would also be possible to provide one additional marking field (denoted as "z" for example), and in the event that this marking field has been filled in, to send the corresponding image to all recipients. This facilitates selection of all recipients.

The subject field C4 is a field for entering a subject of the e-mail being sent. Using a writing implement, the user enters the subject of the e-mail in the subject field C4. Where no subject has been entered, the e-mail is given a default subject, for example, "Pictures from ." The "" segment represents the name of the user already set up in the printing apparatus 1100.

The message field C5 is a field for entering an e-mail message. Using a writing implement, the user enters the e-mail message in the message field C5. The message entered here is scanned as image data by the scanner 1110, and attached to the e-mail.

The server address field C6 is a field for entering the IP address of the mail server SV used for sending e-mail. In most instances, the user will enter the address of the SMTP server of his or her Internet service provider. However, where the printing apparatus 1100 has a preset address, this field need not be filled in. The mail server SV may be one that is proprietary to the manufacturer of the printing apparatus 1100, with the IP address thereof being preset in the printing apparatus 1100.

The sender's address field C7 is a field for entering the e-mail address of the user who is sending the e-mail. However, where the user's e-mail address is preset in the printing apparatus 1100, this field need not be filled in.

The discussion now refers back to FIG. 3. The user enters all of the required information in the order sheet ST that was printed out in the preceding Step S120 (Step S130). FIG. 6 depicts an example of the order sheet ST containing the required information entered by the user. After completing filling out of the order sheet ST, the user places the order sheet ST on the scanner 1110, and using the control panel performs an operation to initiate scanning of the order sheet ST.

When the CPU 1160 detects that the user has initiated scanning, it scans the order sheet ST with the scanner 1110 and performs an analysis of the entered items (Step S140).

The CPU 1160 also carries out a character recognition process on the new e-mail address field C11, the subject field C4, the server address field C6, the sender's address field C7 and so on, to convert the written text entered in the order sheet ST to text format (Step S150). This process can be accomplished using known OCR technology. In the present embodiment, character recognition is not performed on the message entered in the message field C5; instead, in the preceding Step S140, it is scanned as image data representing the message. It is possible thereby not only to simplify the character recognition process, but also to make it possible for the message to include illustrations or other non-text information. Of course, it would also be possible to perform character recognition processing on the message in the same manner as for the subject.

Next, the CPU 1160 resizes each set of image data, to the size specified in the resizing field C2 of the order sheet ST (Step S160). Then, for the recipients specified by the image designation field C3, there is generated an e-mail to which the specified image data is attached and which includes the message entered in the message field CS, the subject entered in the subject field C4, and the sender's address entered in the sender's address field C7 (Step S170).

Finally, the CPU 1160 sends the e-mail generated in Step S170, via the mail server SV specified in the server address field C6. An example of the transmitted e-mail is depicted in FIG. 7.

According to the printing apparatus 1100 of the present embodiment discussed above, image data intended for transmission as an e-mail attachment can be selected from the order sheet ST rather than from the liquid crystal monitor 1145 provided to the printing apparatus 1100. For this reason there is no need to perform image data selection on a tiny screen, and convenience for the user can be improved. Moreover, where the order sheet ST of the present embodiment is used, it is possible not only to select image data and recipients, but also to make various settings such as specifying the size of the image data and specifying the mail server. Thus, even a person who is unfamiliar with computer operation can easily send e-mails with image data attached.

A3. Modifications of Embodiment 1

While the invention has been shown hereinabove in terms of Embodiment 1, the invention is not limited to this embodiment and may assume various other arrangements without departing from the spirit thereof. For example, functions accomplished by software could instead by accomplished by hardware. In addition, the following modifications are possible.

A3-1. Modification 1

The layout of the order sheet ST may take various forms besides that shown in FIG. 5. For example, the server address field C6 or the sender's address field C7 could be omitted, with all of these settings being made through the control panel 1140 of the printing apparatus 1100 instead. It would also be possible to omit the subject field C4 or the message field C5, and to instead attach a default subject or message already stored in memory in the printing apparatus 1100. Additionally, the recipient address field C1 could be omitted, with all of the recipients' e-mail addresses being specified using the control panel 1140 of the printing apparatus 1100 instead.

A3-2. Modification 2

In the order sheet ST depicted in FIG. 5, a default subject or a preset IP address could be printed in light color in the subject field C4, the server address field C6, or the sender's address field C7. Then, if the user wishes to use a subject different from the default one or a mail server different from the normal one, this information may be entered in the corresponding fields. This allows the user to easily verify the default settings for subject, server address, and so on. With this arrangement, by performing image processing to remove the light color printed on the order sheet ST during scanning of the order sheet ST by the CPU 1160 of the printing apparatus 1100. It will be possible to extract the handwritten text written over the light color text.

A3-3. Modification 3

In the present embodiment, the printing apparatus 1100 is constituted so that image data is selected using the order sheet ST, when sending image data as an e-mail attachment. On the other hand, during transfer of image data to a server that archives image data (such as a Web server or FTP server), it would be possible to carry out selection of image data for transfer using the order sheet ST. Where the image transmission apparatus is a facsimile apparatus, selection of image data for transmission may be carried out using the order sheet ST, during transmission of images to another facsimile apparatus over a phone network. In the preceding embodiment, the recipients of the image data are specified using their e-mail addresses, but a server that archives image data can be specified based on its IP address or URL, while a facsimile apparatus can be specified through its phone number.

A3-4. Modification 4

In the preceding embodiment, preliminary selection of image data was carried out by means of a prescribed GUI displayed on the liquid crystal monitor 1145, but this process could be eliminated. In this case, all of the image data input from the memory card MC etc. will be printed onto the order sheet ST, and the user will select the desired image data from among them. Likewise, while preliminary selection of the recipient e-mail addresses was carried out by means of a GUI, by instead printing out the entire address list stored in the flash memory 1180, the user can select the desired recipients from among these. Alternatively, all of the recipient e-mail addresses can be entered by hand on the order sheet ST.

A3-5. Modification 5

In the preceding embodiment, the printing apparatus 1100 independently performs input of image data, printing and scanning of the order sheet ST, and transmission of the image data. It would be possible instead to connect the printing apparatus 1100 to a computer, and by installing a prescribed program on the computer, to carry out processes analogous to the e-mail transmission process described above. In this case, the computer can perform input of the image data, instruct the printing apparatus 1100 to print out the order sheet ST, scan the order sheet ST via the printing apparatus 1100, and send an e-mail with attached image data to the specified recipients. With such a configuration, the system composed of the printing apparatus 1100 and the computer would be equivalent to the image transmission apparatus herein.

2nd Embodiment

Figure 8:
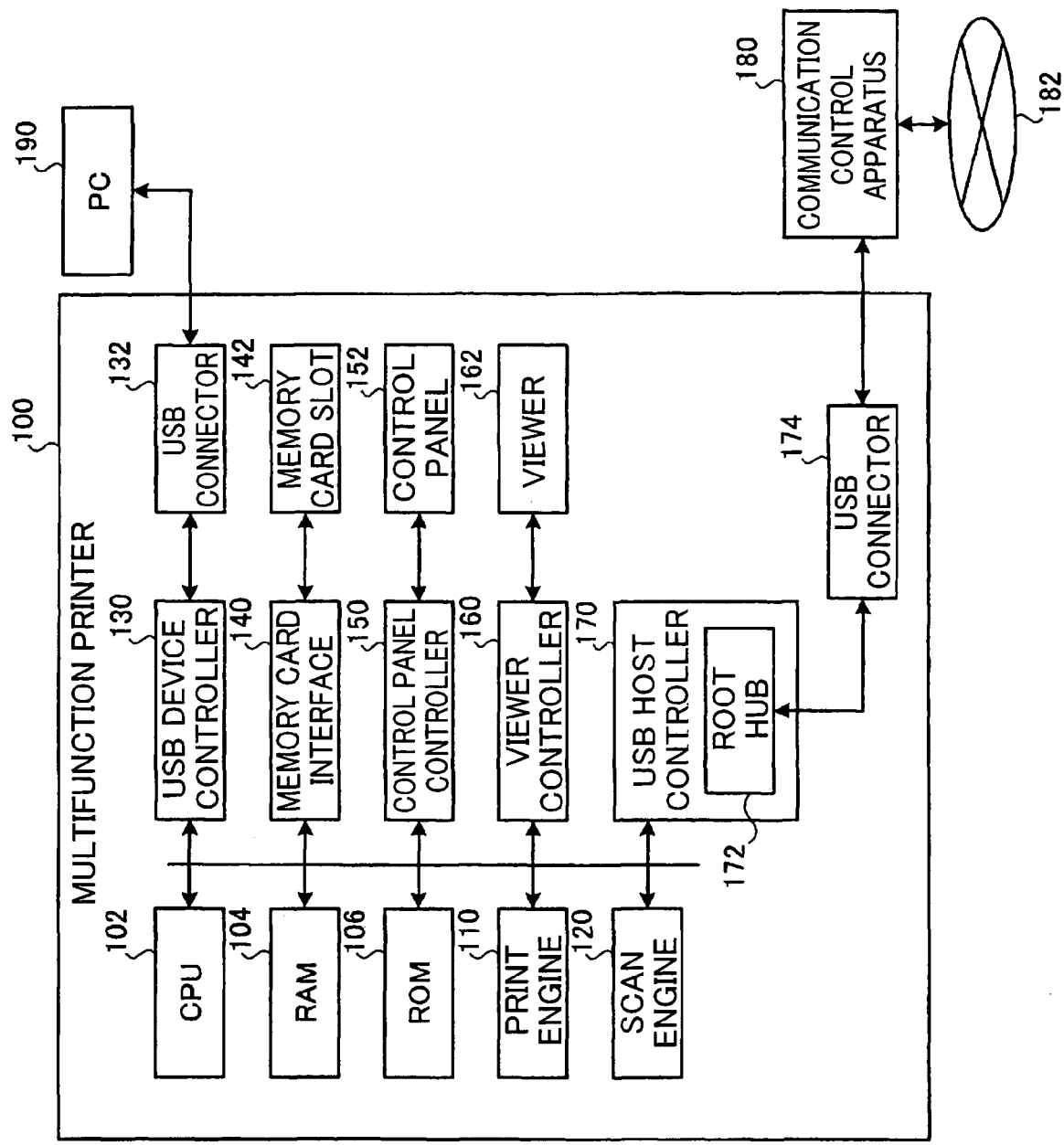
FIG. 8 is a block diagram depicting the configuration of an information processing system.

B1. Configuration of Information Processing System:

FIG. 8 is a block diagram depicting the configuration of an information processing system. While FIG. 8 depicts the information processing system on the transmitting end, the configuration of the information processing system on the receiving end is similar to the information processing system on the transmitting end.

This information processing system is composed of a multifunction printer 100 connected to the Internet 182 via a communication control apparatus (dongle) 180 which represents an application of the image transmission apparatus. The communication control apparatus 180 on the transmitting end transmits data via the Internet 182. A communication control apparatus 180 on the receiving end similar in design to the communication control apparatus 180 on the transmitting end receives the data via the Internet 182, and hands the data off to the multifunction printer 100.

The multifunction printer 100 is equipped with a central processing unit (CPU) 102, a RAM 104, a ROM 106, a print engine 110, a scan engine 120, a USB device controller 130, a USB host controller 170, a memory card interface 140, a control panel controller 150, and a viewer controller 160. The control software of the multifunction printer 100 is stored in the ROM 106. By means of executing the control software stored in the ROM 106, the central processing unit 102 can accomplish the various functions of the multifunction printer 100.

The USB device controller 130 of the multifunction printer 100 is connected to a USB connector 132. A personal computer (PC) 190 is connected this USB connector 132. It is possible to connect any USB host to the USB connector 132, besides the personal computer 190. The USB host controller 170 has a root hub 172, and a USB connector 174 is connected to the root hub 172. It is possible to connect a USB device, such as a digital camera or hard disk drive (HDD) to this USB connector 174.

The memory card interface 140 is connected to a memory card slot 142 for a memory card. A control panel 152 serving as input means is connected to the control panel controller 150. A viewer 162 serving as image displaying means is connected to the viewer controller 160. Using the control panel 152, the user can input various instructions while observing the images and menus displayed on the viewer 162.

The print engine 110 is a printing mechanism for executing printing in response to given print data. The print data presented to the print engine 110 is created by the central processing unit 102 interpreting received data presented to it from the external personal computer 190 connected via the USB connector 132, and performing color conversion and halftoning processes on the data. It is also possible for the print data presented to the print engine 110 to be generated from image data stored on a memory card that has been inserted into the memory card slot 142, or from image data provided by a digital still camera connected via the USB connector 174. A configuration whereby the print engine 110 has the conversion and halftoning functions instead of the central processing unit 102 is possible as well. Herein, execution of printing the print data generated from image data will also be referred to as "printing of image data."

The scan engine 120 is a mechanism for scanning images and generating scan data that represents the images. Scan data generated by the scan engine 120 is converted to image data of prescribed format (e.g. the JPEG format) by the central processing unit 102. This converted image data is also referred to as scanned image data. Scanned image data is transferred to the personal computer 190. Scanned image data can also be stored on a memory card that has been inserted into the memory card slot 142, or on a device connected via the USB connector 174. A configuration whereby the scan engine 120 has the function of creating image data from scan instead of the central processing unit 102 is possible as well.

The communication control apparatus 180 is connected to the multifunction printer 100 via the USB connector 174. The communication control apparatus 180 transmits Fax data via the Internet 182. The image processing to be described later is performed by this communication control apparatus 180. The communication control apparatus 180 may be provided integrally with the multifunction printer 100 as well.

Figure 9:
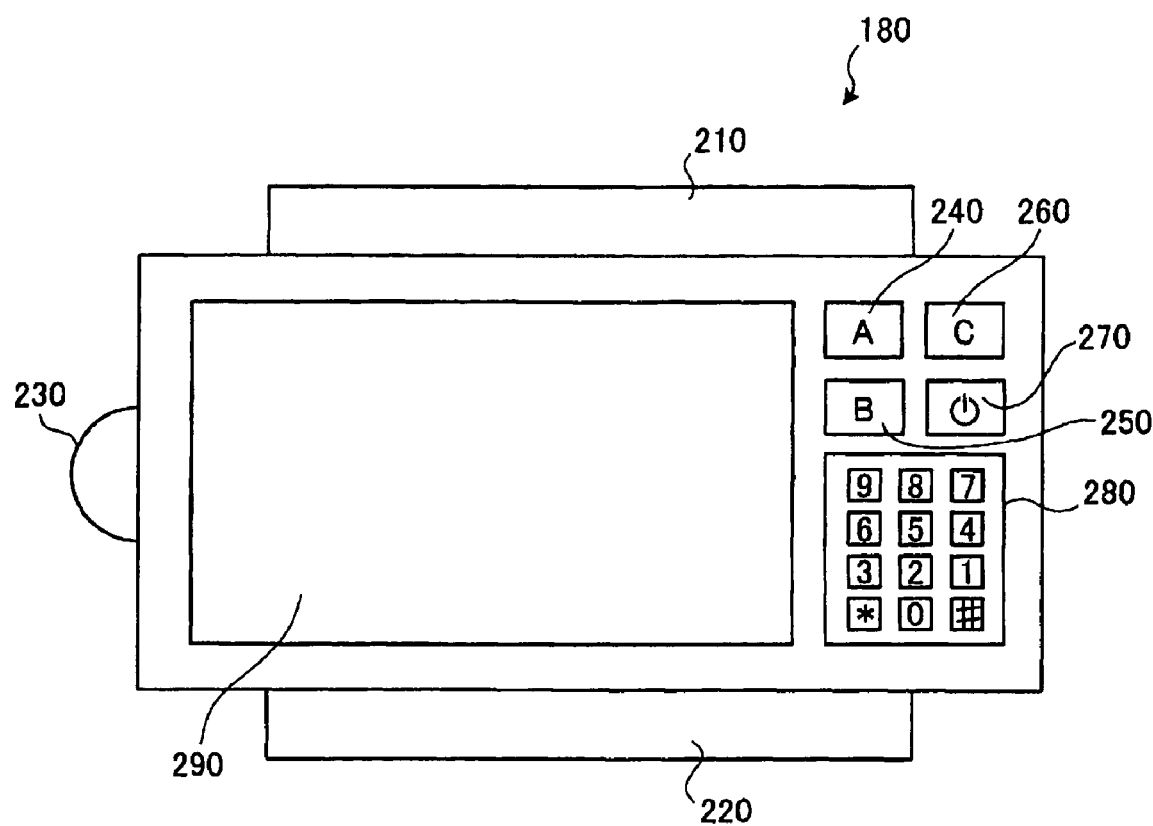
FIG. 9 is an illustration illustrating the controls and connections of a communication control unit.

FIG. 9 is an illustration illustrating the controls and connections of the communication control unit 180. This communication control apparatus 180 is furnished with a connection terminal 210 and a connection terminal 220, as well as with a lamp 230 and control portions 240-270. The connection terminal 210 is connected to the multifunction printer 100 shown in FIG. 8. The connection terminal 220 is connected to Internet 182 shown in FIG. 8. The lamp 230 lights up so as to prompt the copy operation when a received file is to be copied to a memory card.

The control portion 240 (Button A) is a command button for instructing preparation of data for transmission. By pressing this Button A, the communication control apparatus 180 will initiate the process of preparing data for transmission. The control portion 250 (Button B) is a command button for instructing that transmission of data be initiated. By pressing this Button B, the communication control apparatus 180 will initiate the process of transmitting data. The control portion 260 (Button C) is a command button for instructing printout of an order sheet. By pressing this Button C, the communication control apparatus 180 will initiate the process of printing out an order sheet. The control portion 270 is the power button. By pressing this button, the power can be turned on or off.

Dial buttons 280 are for entering numbers. For example, when the user enters the phone number of the recipient of a fax transmission, the numbers will be entered using the number buttons on the dial buttons 280. A liquid crystal screen 290 is a screen display portion composed of liquid crystals. Using this liquid crystal screen 290, the communication control apparatus 180 displays the fax recipient, or displays a thumbnail image of the image being transmitted.

Figure 10:
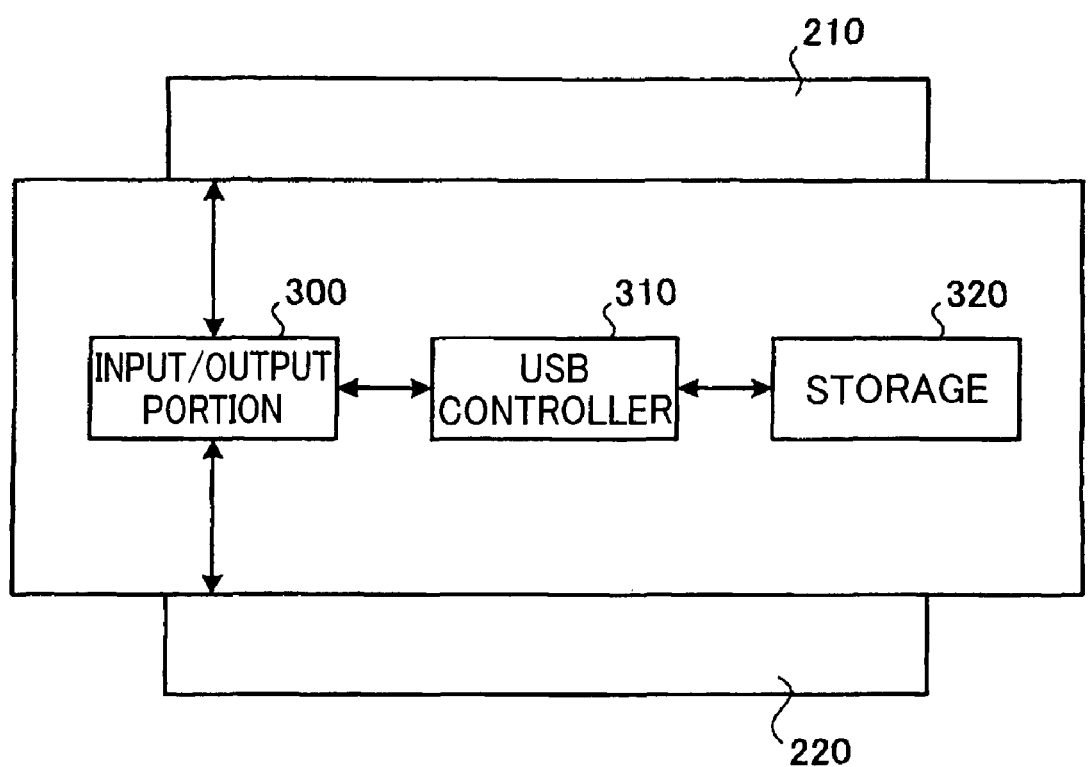
FIG. 10 is a block diagram depicting the functional configuration of the communication control unit.

FIG. 10 is a block diagram depicting the functional configuration of the communication control unit 180. The communication control apparatus 180 is composed of an input/output portion 300, a USB controller 310, and storage 320. The communication control apparatus 180 is connected to the outside by means of a USB interface. However, the format of the interface is not limited thereto, it being possible to use some other interface instead.

The input/output portion 300 is composed of a USB interface circuit, and controls data transfer. Specifically, the input/output portion 300 receives data sent to it from the multifunction printer 100 via the USB connector 174, and sends this data to the USB controller 310, as well as controlling sending of this data.

The USB controller 310 is composed of a CPU, for example. The USB controller 310 executes a process for storing data to the storage 320 and a process for reading data from the storage 320, as well as encoding and decoding dongle data. In the present embodiment, the USB controller 310 corresponds to the "input unit," "printing unit," "scanning unit," and "analyzing unit," and "transmitting unit" herein. The storage 320 is composed of EEPROM for example, and stores data.

FIG. 11 is an illustration illustrating the general design of an order sheet. The order sheet depicted in FIG. 11 is composed of an identifying section 405, an addressee input section 410, an image selection section 420, and a delivery comment section 430. Content corresponding to the above sections is printed on the order sheet, and each section is designed to be filled out in mark sensing card format, by filling in mark fields.

The identifying section 405 is a field in which are printed an alignment mark and an identification mark. This alignment mark and the identification mark are not printed so as to be visually recognizable. Specifically, information for determining, for example, which position is black or which location has been checked during scanning by the multifunction printer 100 is printed in this field. Also printed in this section is information that enables determination of which order sheet a scanned order sheet is, after a number of order sheets differing in content have been printed out.

The addressee input section 410 is a field for inputting addressees. FIG. 11 depicts an example in which Recipient A, Recipient B, and Recipient C have been previously registered as addressees. In FIG. 11, Groups 1 to 3 can each be specified for each of the addressees. A number that has not been registered previously can also be used as an addressee. In this case, the number can be entered in mark sensing card format, in the "Other" field provided below the addressees.

The image selection section 420 is a field for selecting images for transmission to addressees. FIG. 11 depicts an example in which Image A, Image B, and Image C have been prepared as images. In the example of FIG. 11, it is possible to instruct that the respective images be sent to Groups 1 to 3. Specifically, fields addressed to Groups 1 to 3 are provided below Image A, and the addressees can be specified by selecting any or several of these fields.

The delivery comment section 430 is a field for selecting and specifying delivery comments. Delivery comments can be specified by marking appropriate ones from among a number of predefined comments. The predefined delivery comments can be comments relating to print mode when printing out the image data, and the like. As specific examples, it would be possible to select comments from among the comments, "print at L size," "print at A4 size," "print on photo paper," "print on plain paper," "please print neatly," "here is the photo I promised," or "Hi, it's (my name)." Where "Hi, it's (my name)." has been selected, the name of the user registered in the communication control apparatus 180 will be input in the (my name) section. A free comment can also be selected in the delivery comment section 430. In this case, the user will enter text manually in the handwriting input area, and this text will be transmitted to the recipient in order to transfer the message.

B2. Order Sheet Printing Process

Figure 12:
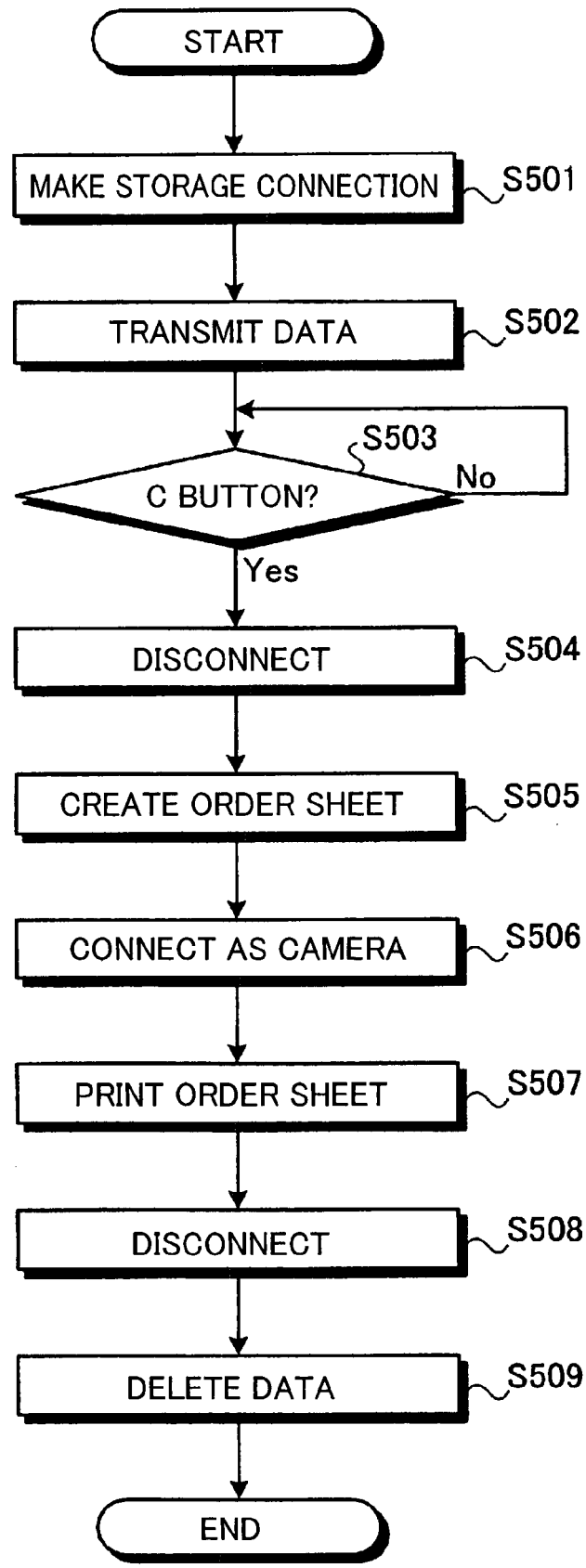
FIG. 12 is a flowchart illustrating a printing process for printing an order sheet.

FIG. 12 is a flowchart illustrating the printing process by which the communication control apparatus 180 prints an order sheet using the multifunction printer 100. The communication control apparatus 180 initiates this printing process in the event of input of Button A shown in FIG. 9. When this printing process is initiated, the communication control apparatus 180 first makes a storage connection to the multifunction printer 100 (Step S501). A storage connection refers to connecting the communication control apparatus 180 to the multifunction printer 100 as a storage device based on the USB standard. Next, the communication control apparatus 180 receives data from another communication control apparatus 180 via the Internet (Step S502). Here the received data includes image data. This image data is used as Images A to C shown in the image selection section 420 depicted in FIG. 11. The communication control apparatus 180 then waits for input of Button C (Step S503). In the absence of input of Button C (Step S503: No), the communication control apparatus 180 waits for input of Button C. In the event of input of Button C (Step S503: Yes), the communication control apparatus 180 severs the storage connection with the multifunction printer 100 (Step S504).

Next, the communication control apparatus 180 creates an order sheet (Step S505). When the order sheet is generated, the communication control apparatus 180 next connects to the multifunction printer 100 as a camera device based on the USB standard (Step S506). The communication control apparatus 180 then causes the multifunction printer 100 to print the order sheet, by means of the printing function of the camera device based on the USB standard (Step S507). After printing of the order sheet has been carried out, the communication control apparatus 180 severs communication with the multifunction printer 100 (Step S508). The communication control apparatus 180 then deletes the data (Step S509), and terminates this series of processes.

In the aforementioned Step S509, the communication control apparatus 180 deletes the image data that was used to print the order sheet; however, the data representing information for printing in the identifying section 405, i.e. data representing marks for positioning used during scanning, and control data indicating what check contents mean, is not deleted. The data acquired in Step S502 mentioned above is not deleted either. The specifics of this deletion process apply to subsequent descriptions of processes hereinbelow as well. Since the multifunction printer 100 can read out and print an order sheet in the above manner, the user can carry out an order by filling out the order sheet and scanning it with the multifunction printer 100.

B3. Order Sheet Transmission Process

Figure 13:
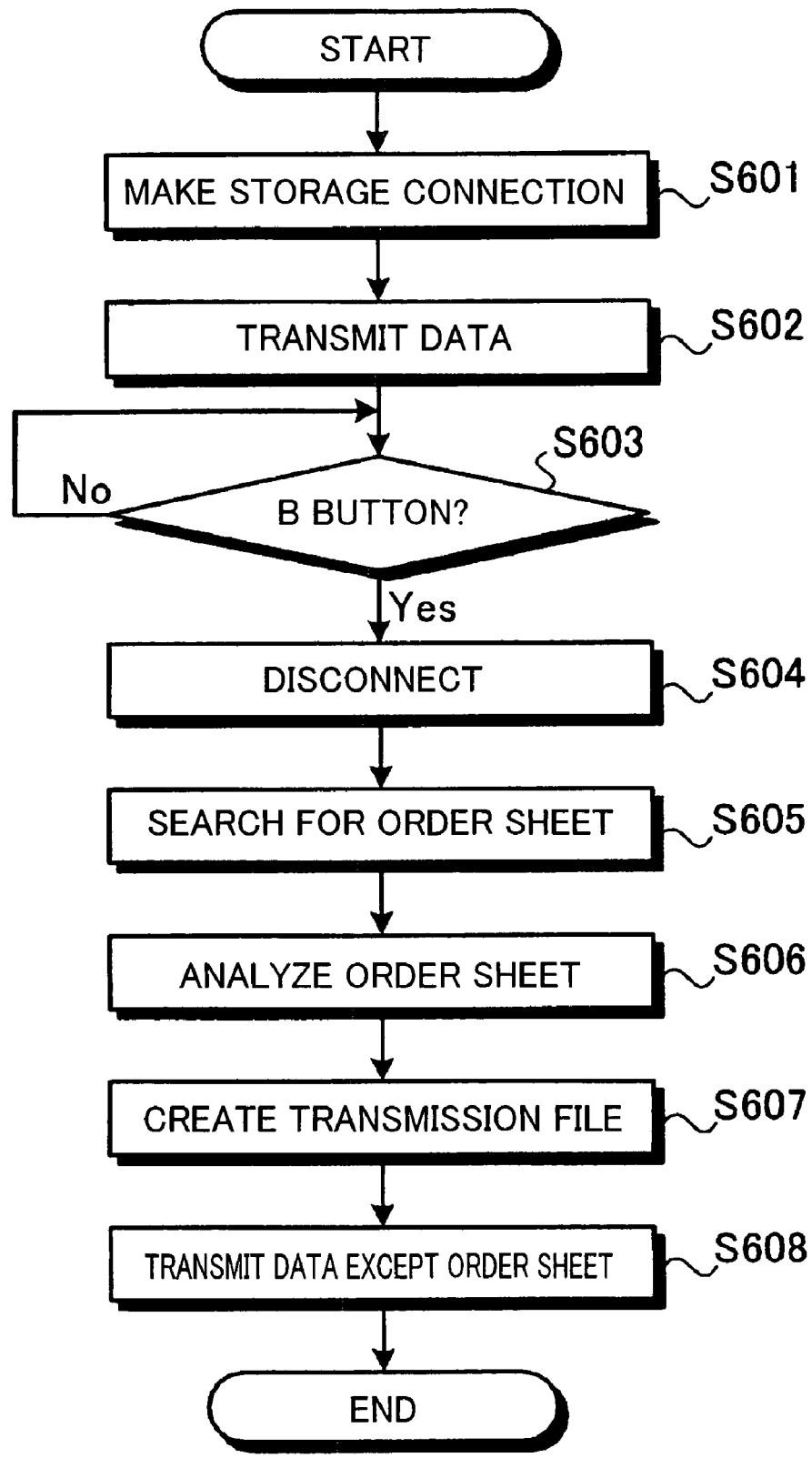
FIG. 13 is a flowchart illustrating the order sheet transmission process.

FIG. 13 a flowchart illustrating the order sheet transmission process by the communication control apparatus 180. The communication control apparatus 180 initiates this transmission process in the event of input of Button A shown in FIG. 9. When this transmission process is initiated, the communication control apparatus 180 first makes a storage connection to the multifunction printer 100 (Step S601). Next, the communication control apparatus 180 receives scanned image data from the multifunction printer 100 (Step S602). At this time, the communication control apparatus 180 stores the received data in the storage 320.

Subsequently, the communication control apparatus 180 waits for input of Button B shown in FIG. 9 (Step S603). In the absence of input of Button B (Step S603: No), the communication control apparatus 180 waits for input of Button B. In the event of input of Button B (Step S603: Yes), the communication control apparatus 180 severs communication with the multifunction printer 100 (Step S604). The communication control apparatus 180 then performs an order sheet search (Step S605). The order sheet search refers to searching for and extracting order sheet information from the scanned image data received from the multifunction printer 100 and stored in the storage 320.

After the order sheet search, the communication control apparatus 180 performs an order sheet analysis (Step S606). Order sheet analysis refers to analyzing whether marks have been made in input fields, and extracting marked information. Once the order sheet analysis has been completed, the communication control apparatus 180 creates a transmission file (Step S607). Once the transmission file has been created, the communication, control apparatus 180 transmits this transmission file to the communication control apparatus 180 on the receiving end (Step S608). That is, in this Step S608 the communication control apparatus 180 does not transmit scanned image data representing the order sheet per se, but rather transmits mark information extracted through order sheet analysis, necessary image data, and other such substantial information. The communication control apparatus 180 then terminates the series of processes.

Figure 14:
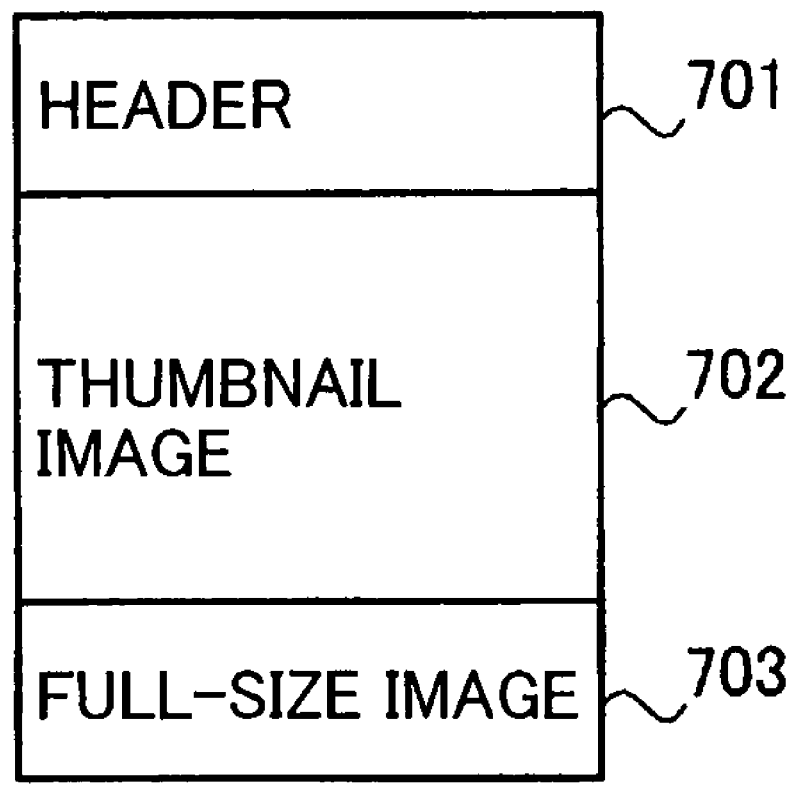
FIG. 14 is an illustration illustrating the configuration of a transmission file.

FIG. 14 is an illustration illustrating the configuration of a transmission file. The transmission file created by the communication control apparatus 180 is made up of a header 701, a thumbnail image 702, and a full-sized image 703. The header 701 contains addressee information such as the addressee's address or fax number, and the creation date. The thumbnail image 702 is a reduced version of the full-sized image 703, intended for display on a small display or the like. The thumbnail image 702 can also be recreated as a thumbnail image having an image of a comment specified in the order sheet delivery comment field, shown superimposed on the reduced image of the full-sized image 703. The full-sized image 703 is the image intended for transmission and printing. The full-sized image 703 can be image data in the JPEG format, for example.

Figure 15:
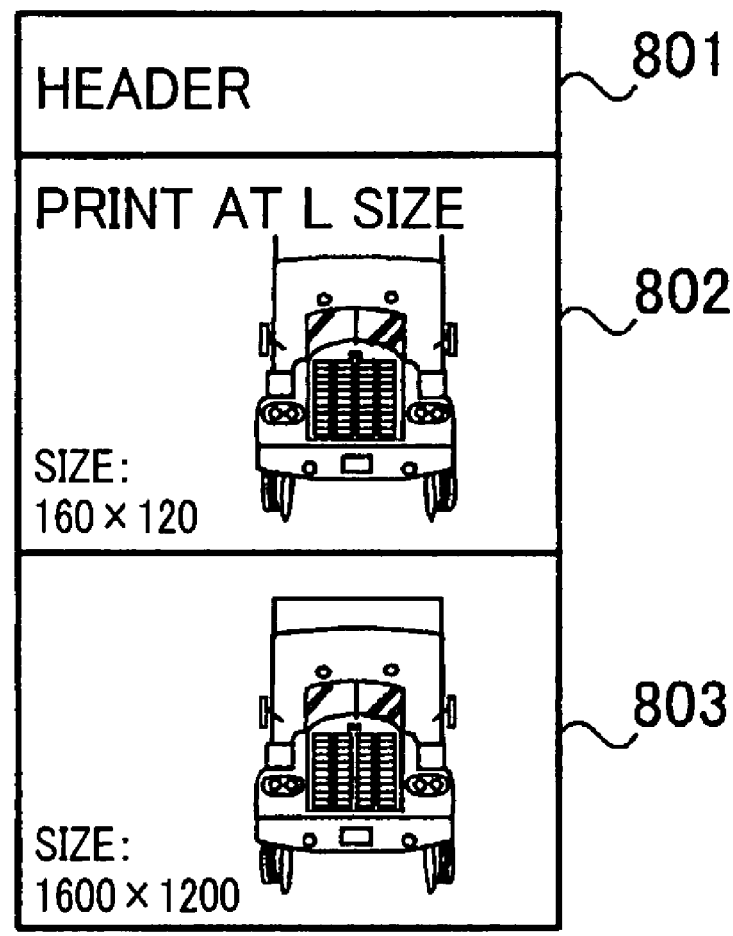
FIG. 15 is an illustration showing a first example of a transmission file.

FIG. 15 is an illustration showing a first example of a transmission file. The transmission file depicted in FIG. 14 is made up of the header 701, the thumbnail image 702, and the full-sized image 703; in the example of FIG. 15, these are constituted as a header 801, a thumbnail image 802, and a full-sized image 803 respectively. Information written on the original image is written as-is to the header 801. That is, information such as the image shooting date, shooting camera name, aperture, shutter speed and so on is written to the header 801.

An image of the delivery comment, superimposed on a reduced image of the full-sized image 803, is written to the thumbnail image 802. The size of the thumbnail image 802 can be 160×120 dots, for example. FIG. 15 depicts an example of the thumbnail image created where "print at L size" has been selected on the order sheet. This comment can be selected by means of marking the appropriate field of the delivery comment section 430 shown in FIG. 11. By identifying this marked field, the communication control apparatus 180 can identify the content of the comment. The communication control apparatus 180 then writes the comment to the reduced version of the full-sized image 803, as shown by the thumbnail image 802. The full-sized image 803 is an image of JPEG format for example, and will serve as-is as the image for printing. The size of the full-sized image 803 will differ depending on the specifications of the digital camera with which the image was shot, but can be 1600×1200 dots for example.

Figure 16:
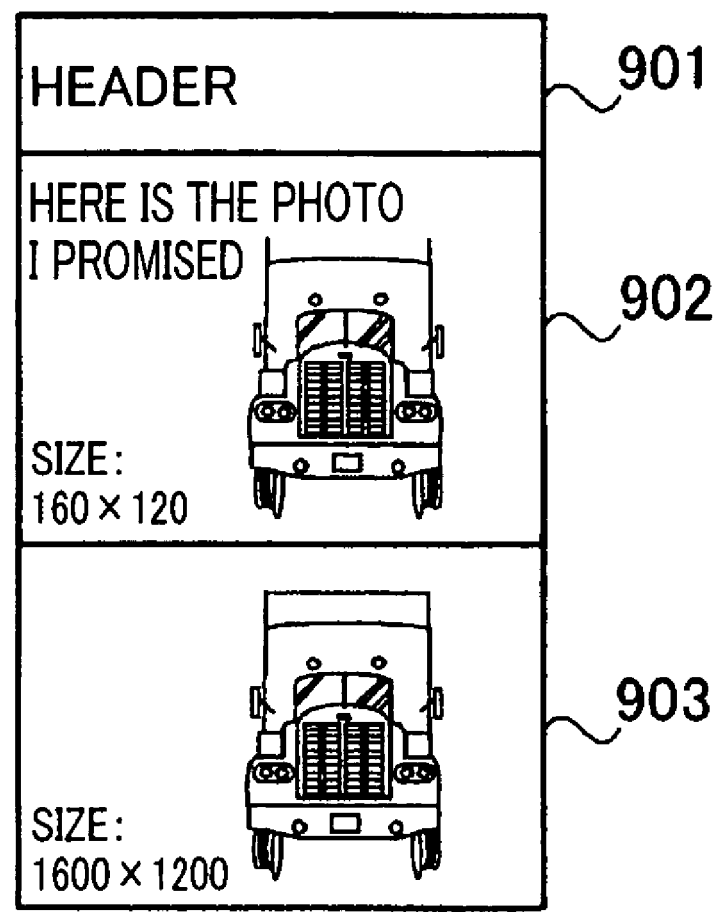
FIG. 16 is an illustration showing a second example of a transmission file.

FIG. 16 is an illustration showing a second example of a transmission file. The transmission file depicted in FIG. 14 is made up of the header 701, the thumbnail image 702, and the full-sized image 703; in the example of FIG. 16, these are constituted as a header 901, a thumbnail image 902, and a full-sized image 903 respectively. The addressee's number and the creation date are written to the header 901.

An image of the delivery comment, superimposed on a reduced image of the full-sized image 903, is written to the thumbnail image 902. FIG. 16 depicts an example of the thumbnail image created where "Here is the photo I promised" has been selected on the order sheet. This comment can be selected by means of marking the appropriate field of the delivery comment section 430 shown in FIG. 11. By identifying this marked field, the communication control apparatus 180 can identify the content of the comment. The communication control apparatus 180 then writes the comment to the reduced version of the full-sized image 903, as shown by the thumbnail image 902. The full-sized image 903 is an image of JPEG format for example, and will serve as-is as the image for printing.

Figure 17:
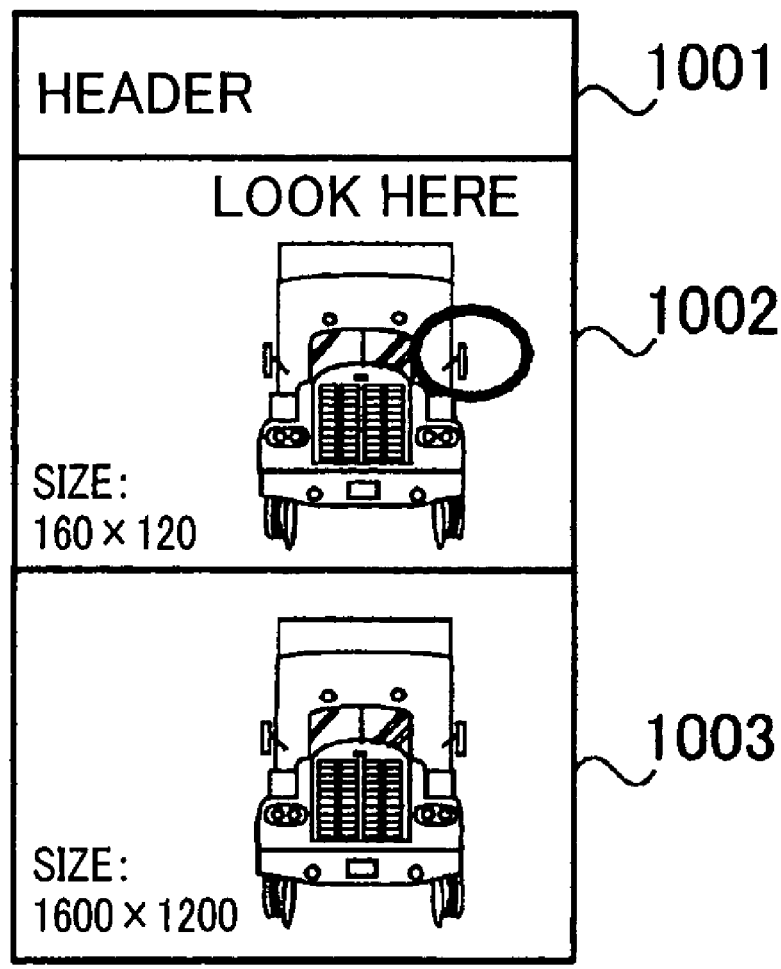
FIG. 17 is an illustration showing a third example of a transmission file.

FIG. 17 is an illustration showing a third example of a transmission file. The transmission file depicted in FIG. 14 is made up of the header 701, the thumbnail image 702, and the full-sized image 703; in the example of FIG. 17, these are constituted as a header 1001, a thumbnail image 1002, and a full-sized image 1003 respectively. The addressee's number and the creation date are written to the header 1001.

An image of the delivery comment, superimposed on a reduced image of the full-sized image 1003, is written to the thumbnail image 1002. FIG. 17 depicts an example of the thumbnail image created where a free comment has been selected on the order sheet. A free comment like that shown in the drawing can be input by marking the appropriate field of the delivery comment section 430 shown in FIG. 11, and the entering the comment in the handwriting input area. The comment "look here," together with a marking in the photograph, are written to the thumbnail image 1002 shown in FIG. 17. Thus, the recipient of this thumbnail image 1002 can be apprised of the fact that there is a particular area of the photograph, indicated by a marking, that need to be looked at. The full-sized image 1003 is an image of JPEG format for example, and will serve as-is as the image for printing.

In the preceding description, there were discussed examples in which the communication control apparatus 180 employed as the image transmission apparatus is attached by way of a storage device or camera device to the multifunction printer 100, but the possible connection formats are not limited to these. The apparatus format is not limited to storage device format, as long as it is possible to store data from the multifunction printer 100. Nor is the format enabling the multifunction printer 100 can to print out images limited to camera device format. In the case of a camera device connection, the connection can be based on the USB Direct ™ or PictBridge ™ standard. If the communication control apparatus 180 supports device types that are able to manage data internally by means of a printer such as the multifunction printer 100, connection by such a device type would be conceivable as well.

As discussed hereinabove, in Embodiment 2, a thumbnail image containing a comment together with an image is sent from the transmitting end to the receiving end, whereby the receiving end can ascertain beforehand from the thumbnail image information regarding the received image. For example, where the recipient is notified beforehand of a comment regarding paper size, the recipient can check the paper size prior to printing, making it possible to avoid the waste associated with printing at the wrong size.

Moreover, where for example the communication control apparatus 180 is an apparatus that allows thumbnail images to be checked by means of the liquid crystal screen 290, it will be possible to view comments prior to actual printing. Where the communication control apparatus 180 on the receiving end has the function of first printing thumbnail images, it will be possible to check the comments prior to printing full-size images, by means of initially printing out the thumbnail images. In the preceding embodiments, even where such functionality provided, since the full-size images are used for actual printing, even if a comment has been appended to the thumbnail image, it will nevertheless be possible to print out the original image without the appended comment.

In the preceding embodiments, since a comment regarding, for example, paper size can be sent from the communication control apparatus 180 on the transmitting end, the recipient can easily ascertain what size of paper to prepare. However, even in such instances, since the printing size is not forcibly determined, if the recipient does not wish to print at the size indicated by the comment, the recipient is free to select some other size for printing, while nevertheless having been notified of the size intended by the sender.

C. Other Aspects

The present invention may also be embodied as an image processing apparatus in the following aspects. Specifically, an image processing apparatus comprises a comment acquiring unit for acquiring a comment; a creating unit for creating a thumbnail image in which information indicating the comment is superimposed on a reduced image of prescribed image data; and a writing unit for writing to the image data the thumbnail image created by the creating unit.

In this case, since a thumbnail image containing a comment together with an image is sent to the receiving end, the receiving end can ascertain beforehand from the thumbnail image information regarding the received image. For example, where the recipient is notified beforehand of a comment regarding paper size, the recipient can check the paper size prior to printing, making it possible to avoid the waste associated with printing at the wrong size.

Additionally, the comment acquiring unit may acquire, as the comment, information that has been included in a prescribed field of the order sheet by receiving image data for a scanned order sheet, In this case, since the comments can be input by means of the order sheet, the desired comments can be specified on paper without having to enter text with a keyboard or to enter comments by means of input operations.

Moreover, the comment acquiring unit may acquire a comment including handwritten input information; and the creating unit may create the thumbnail image by superimposing the handwritten input information on a reduced image of the image data. In this case, it will be possible to input any comment in accordance with the user's intent, rather than selecting from among predetermined comments. This also makes possible specification of a specific location in an image, or flexible instruction input to the receiving end.

It is also possible for the full-size image data of the image data written by the writing unit to be identical to the full-size image data of the former image data having the reduced image. An output unit for outputting image data written by the writing unit may be provided as well, and the comment may be a comment relating to the image data during the output or after output.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image transmission apparatus for transmitting image data through a prescribed communications network, comprising:

an input unit that inputs image data;

a printing unit that prints an order sheet that has an image designation field for designation of image data for the transmission, from among the input image data, the printing unit printing on the order sheet a comment input field for input of a comment;

a scanning unit that scans the order sheet that has been filled in by user;

an analyzing unit that analyzes the scanned order sheet and identifies the image data designated by the image designation field on the order sheet, the analyzing unit analyzing the scanned order sheet and acquiring the comment;

a transmitting unit that transmits the identified image data to a prescribed recipient;

a thumbnail image creating unit that creates a thumbnail image in which the acquired comment is superimposed on a reduced image of prescribed image data, the acquired comment superimposed on the thumbnail image being a comment on a type of printing paper; and a writing unit that writes the created thumbnail image to a portion of the identified image data, wherein the reduced image of prescribed image data having the comment superimposed thereon is a reduced image of the identified image data, and the comment input to the comment field is a comment relating to an output mode which is used when the recipient of the image data outputs the image data.

2. The image transmission apparatus according to claim 1, wherein the printing unit prints a recipient designation field for designating a recipient, in addition to the image designation field on the order sheet;

the analyzing unit identifies the recipient designated by the recipient designation field in the scanned order sheet; and the transmitting unit transmits the identified image data to the identified recipient.

3. The image transmission apparatus according to claim 2, wherein
the recipient is indicated by an e-mail address; and
the transmitting unit transmits the identified image data as an e-mail attachment to the recipient indicated by the e-mail address.

4. The image transmission apparatus according to claim 3, wherein
the recipient designation field of the order sheet is a field for entering the e-mail address as handwritten text;
the scanning unit scans as an image the e-mail address that was entered as handwritten text in the recipient designation field of the order sheet; and
the analyzing unit analyzes the e-mail address scanned as an image, and performs conversion to text format.

5. The image transmission apparatus according to claim 3, wherein
the printing unit additionally prints on the order sheet a field for entering a message to be included in the e-mail;
the analyzing unit analyzes the scanned order sheet and acquires the message from the order sheet; and
the transmitting unit performs the transmission while including the message in the e- mail.

6. The image transmission apparatus according to claim 3, wherein
the printing unit additionally prints on the order sheet a field for specifying the address of a server for transmitting the e-mail;
the analyzing unit analyzes the scanned order sheet and identifies the address of the server specified by the order sheet; and
the transmitting unit performs transmission of the e-mail through the server having the identified address.

7. The image transmission apparatus according to claim 3, further comprising:
an address acquiring unit for acquiring the e-mail address via a prescribed communication path from another apparatus that stores the e-mail address; and
the printing unit prints the acquired e-mail address into the recipient designation field.

8. The image transmission apparatus according to claim 2, wherein
the printing unit prints on the order sheet a marking field for specifying the recipient of each item of the image data;
the analyzing unit analyzes the scanned order sheet and classifies the image data for transmission according to the individual specified recipient; and
the transmitting unit transmits the classified image data to the individual recipient.

9. The image transmission apparatus according to claim 1, wherein
the printing unit prints on the order sheet a field for specifying the size of image data for transmission;
the analyzing unit analyzes the scanned order sheet and identifies the size specified by the order sheet; and
the transmitting unit adjusts the size of the image data for transmission to the identified size.

10. The image transmission apparatus according to claim 1, wherein
the comment field of the order sheet is a field for entering the comment as handwritten text.

11. A method of transmitting image data by an image transmission apparatus comprising a printing apparatus and a scanner, the method comprising:
inputting image data;
printing by the printing apparatus an order sheet that has an image designation field for designation of image data for the transmission, from among the input image data, the printing by the printing apparatus including printing on the order sheet a comment input field for input of a comment;
scanning by the scanner the order sheet that has been filled in by the user;
analyzing the scanned order sheet and identifying image data designated by the image designation field on the order sheet, the analyzing of the scanned order sheet including acquiring the comment;
transmitting the identified image data to a prescribed recipient:,
creating a thumbnail image in which the acquired comment is superimposed on a reduced image of prescribed image data, the acquired comment superimposed on the thumbnail image being a comment on a type of printing paper; and
writing the created thumbnail image to a portion of the identified image data, wherein
the reduced image of prescribed image data having the comment superimposed thereon is a reduced image of the identified image data, and
the comment input to the comment field is a comment relating to an output mode which is used when the recipient of the image data outputs the image data.

12. A computer program product for transmitting image data by a computer using a printing apparatus and a scanner, the computer program product comprising:
first program code for input of image data;
second program code for printing by the printing apparatus an order sheet that has an image designation field for designation of image data for the transmission, from among the input image data, the printing by the printing apparatus including printing on the order sheet a comment input field for input of a comment;
third program code for scanning by the scanner the order sheet that has been filled in by the user;
fourth program code for analyzing the scanned order sheet and identifying image data designated by the image designation field on the order sheet, the analyzing of the scanned order sheet including acquiring the comment;
fifth program code for transmitting the identified image data to a prescribed recipient;
sixth program code for creating a thumbnail image in which the acquired comment is superimposed on a reduced image of prescribed image data, the acquired comment superimposed on the thumbnail image being a comment on a type of printing paper;
seventh program code for writing the created thumbnail image to a portion of the identified image data; and
a non-transitory computer-readable medium having the program code stored thereon, wherein
the reduced image of prescribed image data having the comment superimposed thereon is a reduced image of the identified image data, and
the comment input to the comment field is a comment relating to an output mode which is used when the recipient of the image data outputs the image data.

* * * * *